United States Patent
Appleby et al.

(10) Patent No.: US 7,413,315 B2
(45) Date of Patent: Aug. 19, 2008

(54) INTEGRATED OPTICAL ASSEMBLY AND METHOD FOR PROJECTION DISPLAYS

(75) Inventors: Jon H. Appleby, San Francisco, CA (US); Kathleen Hannon Davies, Fremont, CA (US); Paul D. Frey, San Francisco, CA (US)

(73) Assignee: N-Lighten Technologies, Fremont, CA (US)

( * ) Notice: Subject to any disclaimer, the term of this patent is extended or adjusted under 35 U.S.C. 154(b) by 341 days.

(21) Appl. No.: 11/163,995

(22) Filed: Nov. 7, 2005

(65) Prior Publication Data

US 2007/0070257 A1 Mar. 29, 2007

(51) Int. Cl.
*G03B 21/28* (2006.01)
*H04N 5/64* (2006.01)

(52) U.S. Cl. .......................... 353/119; 353/74; 348/794; 312/7.2

(58) Field of Classification Search ............. 353/72–80, 353/99, 119; 348/836, 843, 787–789, 794; 359/456, 460; 312/7.2, 10.1, 210, 224–227
See application file for complete search history.

(56) References Cited

U.S. PATENT DOCUMENTS

| 6,042,235 | A  | * | 3/2000  | Machtig et al. ............... 353/28 |
| 6,412,956 | B2 | * | 7/2002  | Fujita et al. ................. 353/122 |
| 6,814,449 | B2 | * | 11/2004 | Yamada et al. ................ 353/74 |
| 6,921,174 | B1 | * | 7/2005  | Duggan et al. ................ 353/74 |
| 2003/0137611 | A1 | * | 7/2003 | Chang et al. ................ 348/787 |
| 2005/0168707 | A1 | * | 8/2005 | Feldpausch et al. ........... 353/79 |

\* cited by examiner

*Primary Examiner*—Andrew T Sever
(74) *Attorney, Agent, or Firm*—Thelen Reid Brown Raysman & Steiner; Aaron Wininger

(57) ABSTRACT

An assembly for use in a projection system includes a plurality of optical elements, such as one or more mirrors, a light engine, and a screen, and a monolith. The optical elements are coupled to the monolith to provide a central element of reference, thereby enabling alignment based on the central element of reference.

16 Claims, 5 Drawing Sheets

INTEGRATED OPTICAL ASSEMBLY AND METHOD FOR PROJECTION DISPLAYS

CROSS REFERENCE TO RELATED APPLICATIONS

This application claims benefit of and incorporates by reference U.S. patent application Ser. No. 60/719,408, filed Sep. 21, 2005, entitled "Thin Light Engine Structure," by inventors Jon H. APPLEBY, et al.

TECHNICAL FIELD

This invention relates generally to projection displays, and more particularly, but not exclusively, provides a method for assembly of an optically calibrated mechanical assembly of at least one mirror and a light engine for use in projection displays.

BACKGROUND

One of the most efficient methods for making a large display is to use projected images. Conventionally, the most advanced projection systems use imaging devices such as digital micro-mirror (DMD), Liquid Crystal on Silicon (LCoS), or transmissive LCD micro-displays. Typically, one or two fold mirrors are used in projection displays in order to fold the optical path and reorient it to reduce the cabinet depth of projection displays. In a single fold mirror rear projection display, the light engine converts digital images to optical images with one or more microdisplays, and then projects the optical image to a large mirror which relays the optical images through a rear projection screen to a viewer in front of the screen. The light engine also manages light colors to yield full color images and magnifies the image. In a two fold mirror rear projection display, the projected optical images from the light engine are reflected off of a first fold mirror to a second fold mirror, and then through the rear projection screen to a viewer. The two fold mirror structure provides additional reduction in TV cabinet depth over one fold mirror structures, but typically requires additional cabinet height below the screen. The height of the cabinet below the screen is called chin height and it grows as the light engine projects to a first fold mirror typically positioned below the screen.

Because the imaging devices in projection displays are small, typically less than 1" in diagonal, they are inexpensive to manufacture. However, the small images generated by the imaging devices require magnification factors up to 100 in order to yield the 50"-80" diagonal image typical in consumer projection televisions. However, the large amount of magnification can cause large alignment issues from just a small miscalibration or error in the position of the light engine or mirrors.

Rear projection televisions (RPTVs) made today typically have separate mechanical assemblies for the projector (known as a light engine), the structures that hold the mirrors, and the surrounding enclosure. This is introduces the following problems:

The light engine lens must be designed to match the throw distance of the cabinet's optical assembly. However, since light engines are designed and built separately from the rest of the system, this "lens matching" problem often delays the completion of the light engine design.

The light engine, mirror and screen positions in the cabinet determine the overall angle that the projected light hits the back of the screen. These angles are required to begin the design of the screen Fresnel lens. Since the relative positions of the engine, mirrors and screen are determined after the engine is designed and selected, the tooling of the Fresnel lens and the integration of the product cannot be completed until late in the project. This results in an increased overall project length, and delays product time to market.

Once the light engine is installed in the cabinet the alignment of the picture on the screen is not guaranteed. Various adjustments need to be made in the optical path to correctly size and position the image, often resulting in excessive manufacturing cycle time.

Light engines are complex optical systems and are typically built by specially trained technicians in a clean room environment. The remaining optical path is typically built by minimally trained workers in a traditional TV production line environment.

However, the complex optical adjustments are made at this second stage of manufacturing. The results are not good: dirt and dust are introduced into the optical system and the system is difficult to align correctly.

During shipping of the calibrated system from the factory to the dealer or customer, various parts of this patchwork optical assembly can shift position causing the image to become misaligned.

As such, a new optical assembly and method are needed to overcome the above-mentioned disadvantages.

SUMMARY

Embodiments of the invention provide an integrated optical assembly. The assembly holds both the engine and mirror, or the engine, mirrors, and screen, in one optically calibrated mechanical assembly. Accordingly, because of the assembly's inherent stability and alignment accuracy, the assembly requires no adjustment between the optical elements in the factory. Further, the assembly can be mechanically tailored to hold different light engine types and tolerances.

The light engine is mounted in a fixed position and does not require the multi-axis adjustable stage or mount that is commonly found in other rear projection TVs (RPTVs). The alignment of all optical elements is determined by a central element, called the monolith. All parts are referenced directly to this element, eliminating unnecessary tolerance stacks. The monolith contains integral VESA mount hardware so that when a TV is mounted according to the VESA standard, the optical elements are directly supported. The weight of the enclosure and support electronics does not act on the optical system to misalign the system over time.

The optics are directly supported by and referenced to the monolith so that minor deflections of the external cabinet parts do not effect the system optical alignment. The assembly structure can be designed in such a way as to allow the TV to be mounted in any orientation.

The assembly can mount the Fresnel screen and control its position directly, or it can control its position through the cabinet via reference points that establish a datum to mount the Fresnel screen. The assembly can hold multiple mirrors; in one embodiment it holds a steering (small) mirror and a large mirror, in another it can hold a 3 mirror system. In another embodiment, a single mirror.

The assembly can be adapted to work with any light engine configuration including but not limited to a micro electromechanical system (MEMs)-type engine like TI's digital light projector (DLP), a single panel liquid crystal on silicon (LCoS) engine, a multi-panel LCoS engine, a multi-panel High Temperature Polysilicon (HTPS) engine, and a laser-based engine.

The assembly can further integrate the alignment of bare optical components by becoming the structure to which all of the light engine optical elements assemble, including: the illumination optics, color management system like a ColorQuad™ or Color wheel, light conditioning assemblies like a flies-eye lens array, the projection lens, etc.

In an embodiment of the invention, the assembly includes a plurality of optical components (e.g., any component that generates a light path or is in the light path, such as a light engine, mirrors, screen, etc.) and a monolith. The monolith has a plurality of mounting surfaces for mounting the plurality of optical components. The monolith provides a reference surface, thereby enabling alignment of the plurality of optical components based on the reference surface.

In another embodiment of the invention, the assembly includes first and second mirrors; a light engine; and a monolith. The monolith includes a top plate and a bottom plate. The top plate has four corners on a front side of the top plate, with each corner being adapted for coupling a mirror frame holding the second mirror to the monolith. The bottom plate is coupled to the bottom of the top plate and extends in a forwards direction from the front of the top plate. The bottom plate has a pair of mirror mounts forwardly extending therefrom and are adapted for mounting the first mirror. The bottom plate also has a pair of arms downwardly depending from the bottom plate, which are adapted for mounting the light engine.

In an embodiment of the invention, the method comprises coupling a plurality of optical components to a monolith. In another embodiment, the method comprises: coupling the second mirror to the monolith or a mirror frame; coupling the mirror frame to a monolith; coupling the first mirror to the monolith or a mirror frame; coupling the mirror frame to a monolith; and coupling a light engine to the monolith.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
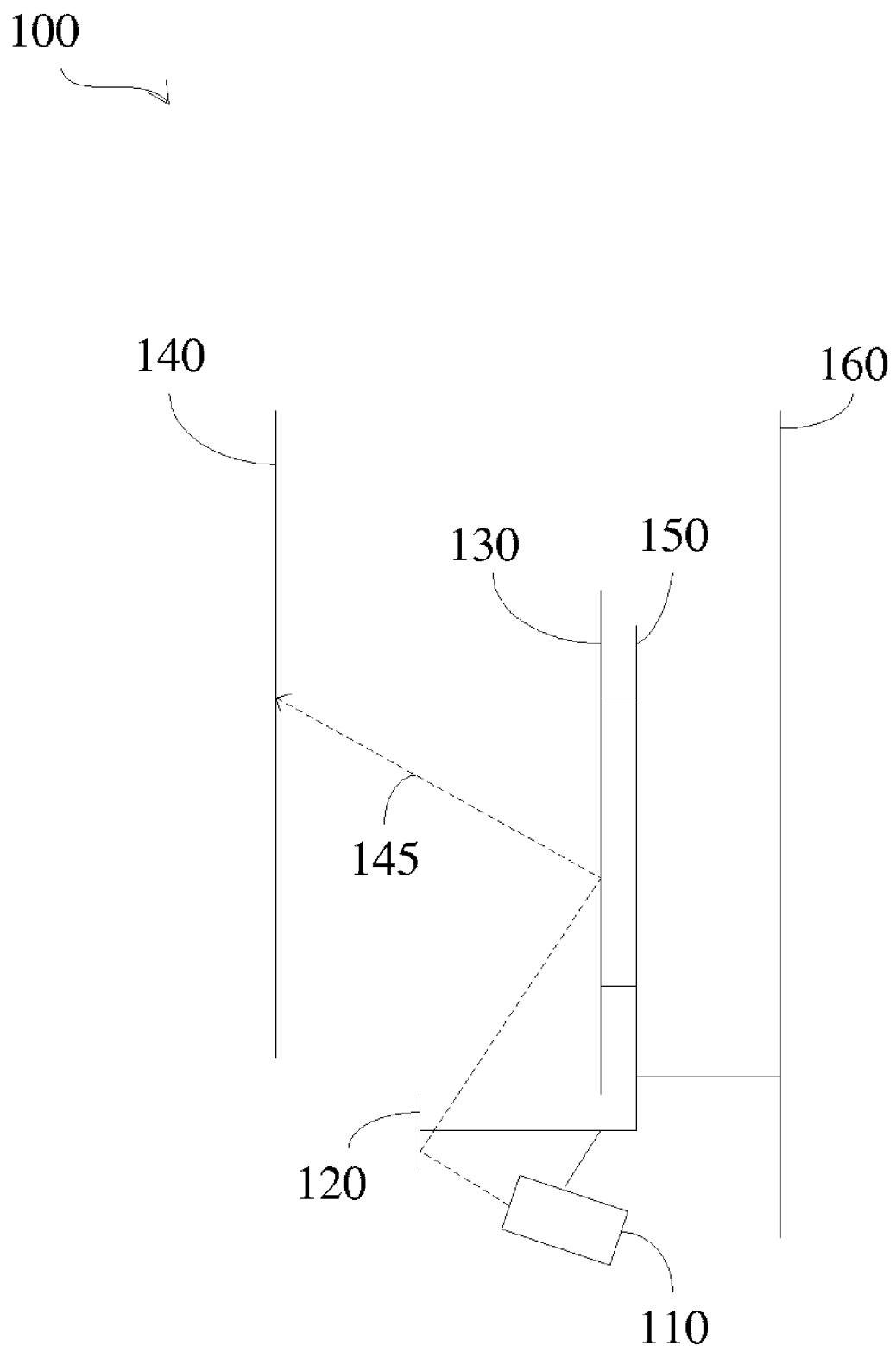
FIG. 1 is a simplified block diagram illustrating a profile of components of the assembly.

FIG. 1 is a simplified block diagram illustrating a side view of components of the assembly 100 for a two fold mirror rear projection display. Embodiments of the invention provide an assembly 100 having all optical components in a single package aligned to a single component. As such, the assembly 100 can be pre-aligned, pre-adjusted and pre-built. The assembly 100 comprises a light engine 110, a first mirror 120, and a second mirror 130, all of which are coupled to the monolith 150. The monolith 150 is coupled to a housing of a display coupled to a housing of a display device, such as a television. The coupling can be via one or more points to a rear wall 160 or other section of the housing.

As will be discussed in further detail below, the light engine 110 is coupled to the monolith 150 at a bottom section. Light projected from the engine 110 bounces off the first mirror 120, which can include a flat steerable mirror, as indicated by dashed line 145. The light then bounces of the second mirror 130, which can include a curved mirror fixed to a front side of the monolith 150 (via a mirror frame in one embodiment), onto the screen 140. In an embodiment of the invention, the light engine 110 and/or the second mirror 130 are also steerable. In another embodiment, the assembly 100 includes a single mirror only, i.e., a single fold mirror rear projection display, e.g., the second mirror 130 and the light engine 110 is coupled to the monolith 150 such that light from light engine 110 bounces off of the second mirror 130 and onto the screen 140.

In an embodiment of the invention, the orientation of the assembly 100 can be rotated 180° such that it is upside down from the illustrated orientation. Accordingly, the assembly 100 can then be hung from a ceiling with the chin height recessed in the ceiling so that the chin is not visible to passerbys.

Figure 2:
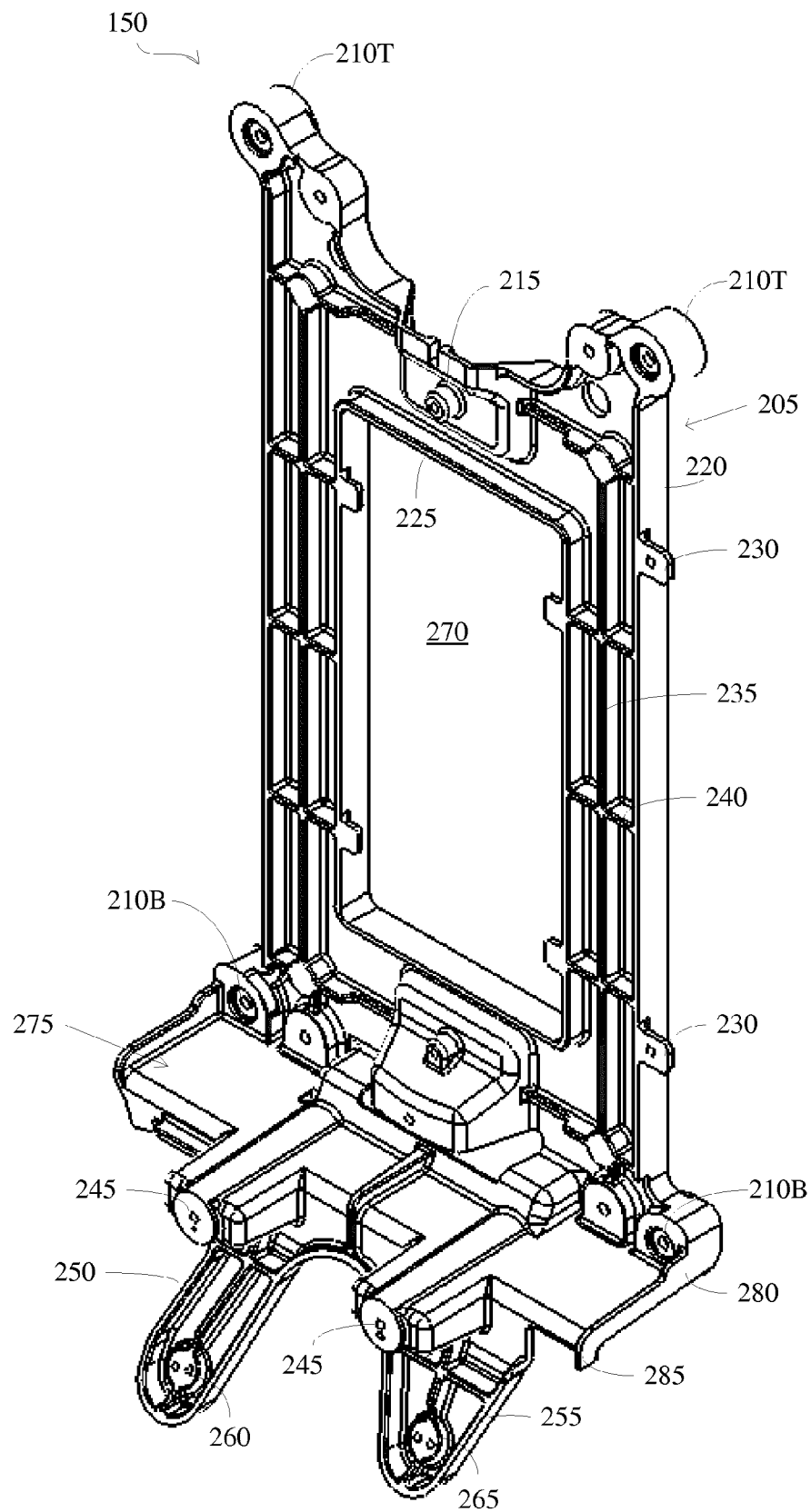
FIG. 2 is a diagram illustrating a monolith of the assembly.

FIG. 2 is a diagram illustrating a front view of the monolith 150. The monolith 150 is for use in a rear projection-type television or monitor having first and second mirrors 120 and 130, respectively, and a light engine 110 located inside a housing of the projection display system. The monolith 150 comprises a plate 205 having a top, a bottom, a front, a back and first and second sides.

The plate 205 has a center hole 270 with a generally rectangular configuration. The center hole 270 has a lip 225 extending in a forwards direction around a periphery of the center hole 270.

Each side of the plate 205 has a spine 235 therein substantially extending vertically from the bottom side to the top side of the plate 205. Each side of the plate 205 further has a plurality (e.g.,3) ribs 240 arranged perpendicular to the spines and approximately equidistant from each other. The ribs 240 extend horizontally through the sides. The ribs 240 and the spines 235 add structural strength to the plate 205, thereby reducing the amount of material require to manufacture the plate 205 and reducing the weight of the plate 205. Each side of the plate 205 has a peripheral lip 220 with a plurality (e.g.,2) tabs 230 extending therefrom. The tabs 230 allow additional elements such as electronic circuits to be mounted to the monolith 150.

The plate 205 has four corners. Each corner has a threaded bore 210 for coupling a mirror frame holding the second mirror 130 to the monolith 150 with a fastener or other coupling mechanism. In an embodiment of the invention, an adhesive can be used in place of or in addition to the fastener. The plate 205 is also adapted to couple a feedback camera 215 to the top of the plate 205.

The monolith 150 has a bottom plate 275 integral to the bottom of the plate 205 and extending in a forwards direction from the front of the plate 205. The bottom plate 275 has a pair of mirror mounts 245 forwardly extending therefrom, which are adapted for mounting the first mirror 120 of a projection-type television thereto. Each mirror mounting 245 has a bore therein for receiving a fastener or other coupling mechanism for securing the first mirror 120 to the mirror mounts. In another embodiment of the invention, an adhesive can be used in place of or in addition to the fastener.

The bottom plate 275 has a pair of arms 250 and 255 downwardly depending from the bottom plate 275. The arms 250 and 255 are adapted for mounting a light engine 110 and related electronics of a projection-type television thereon. The arms 250 and 255 may be angled from the bottom plate 275. The angle is variable and is determined by the optical path required for the system. The bottom plate 275 also has a pair of side flanges 280 at sides of the bottom plate 275. Each of the flanges 280 has a tip 285 thereon. The flanges 280 and the tips 285 increase structural strength of the bottom plate 275.

In an embodiment of the invention, the monolith 150 is made of aluminum. In an embodiment of the invention, the dimensions of the monolith 150, e.g., for a 50" screen, are: overall height=680 mm; overall width=315 mm; spine height=540 mm; spine width=245; max depth=235 mm; hole 270=300 mm high×150 mm wide. For the first mirror 120, the shape includes a trapezoid and have dimensions of width (at top)=200 mm; height=120 mm; width at bottom=100 mm. For the second mirror 130, the dimensions can be in one embodiment: max height=510 mm; max width=805 mm; max depth=55 mm. Note that all dimensions are approximate.

Figure 3:
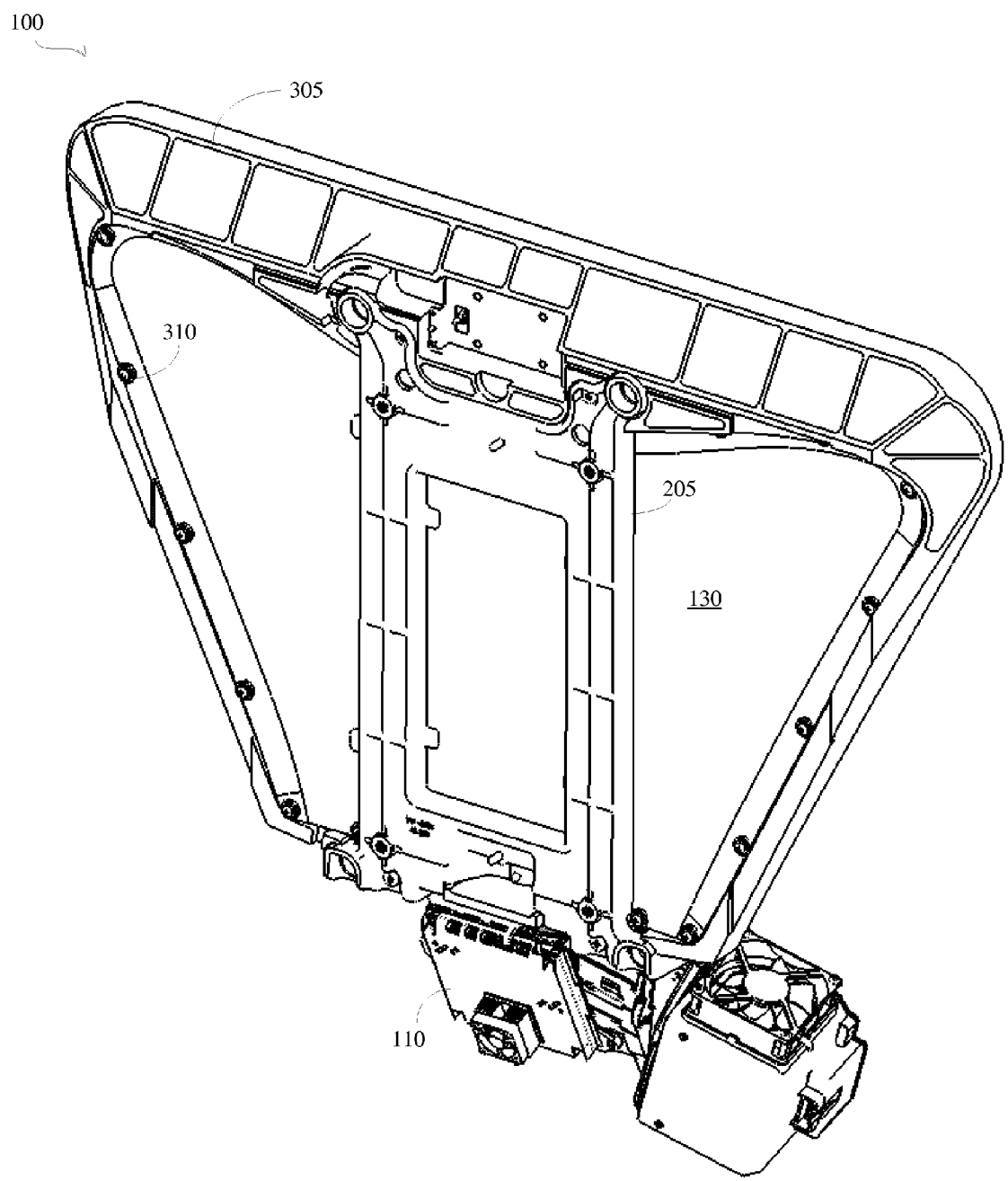
FIG. 3 is a diagram illustrating a rear view of the assembly.
Figure 4:
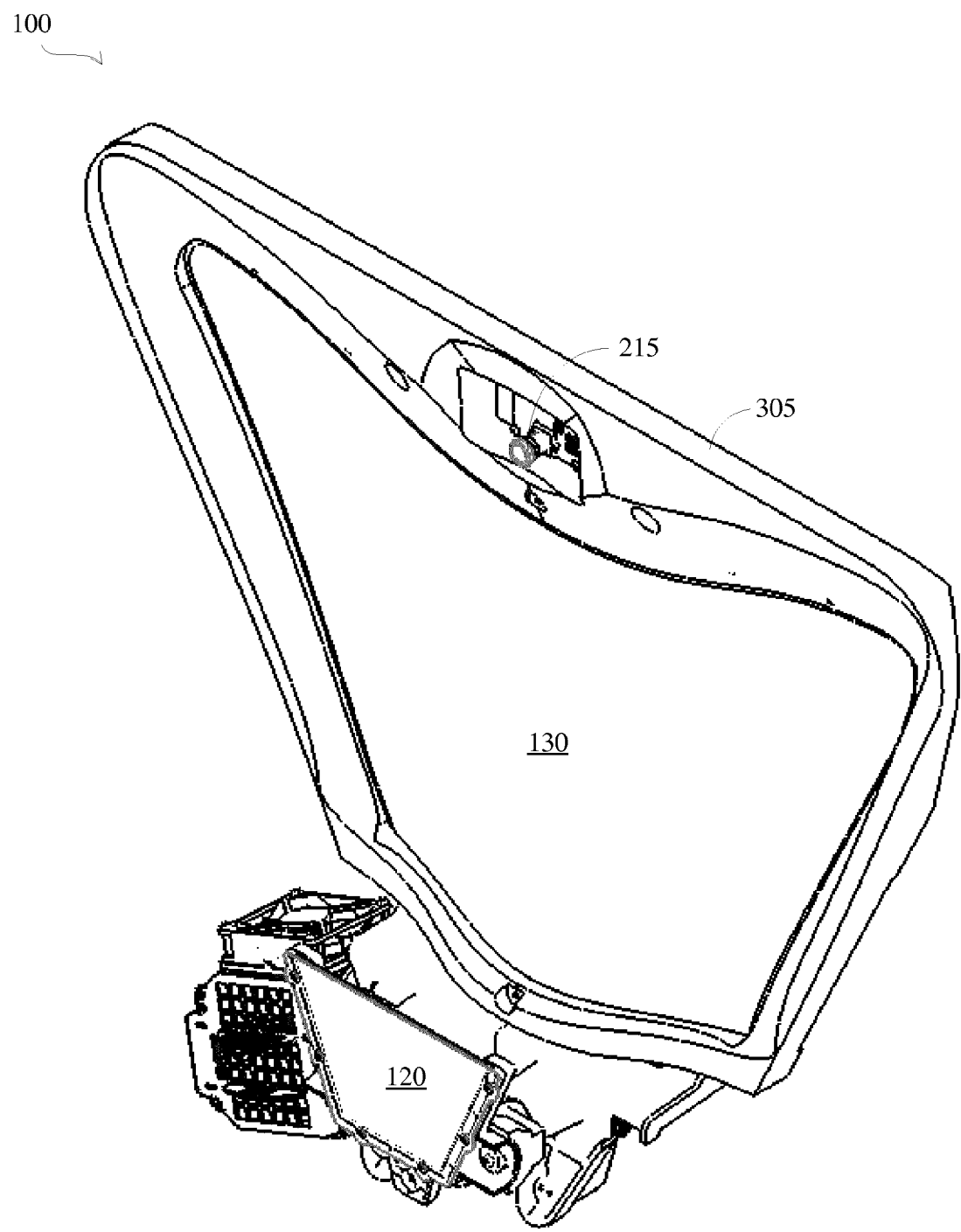
FIG. 4 is a diagram illustrating a front view of the assembly.

FIG. 3 and FIG. 4 are diagrams illustrating rear and front views, respectively, of the assembly 100. As can be seen, the second mirror 130 is coupled to the plate 205 via a mirror frame 305, which is coupled to the second mirror 130 via a plurality of fasteners 310. In an embodiment of the invention, the mirror frame 305 can be coupled to the second mirror 130 via other mechanisms, including an adhesive.

Figure 5:
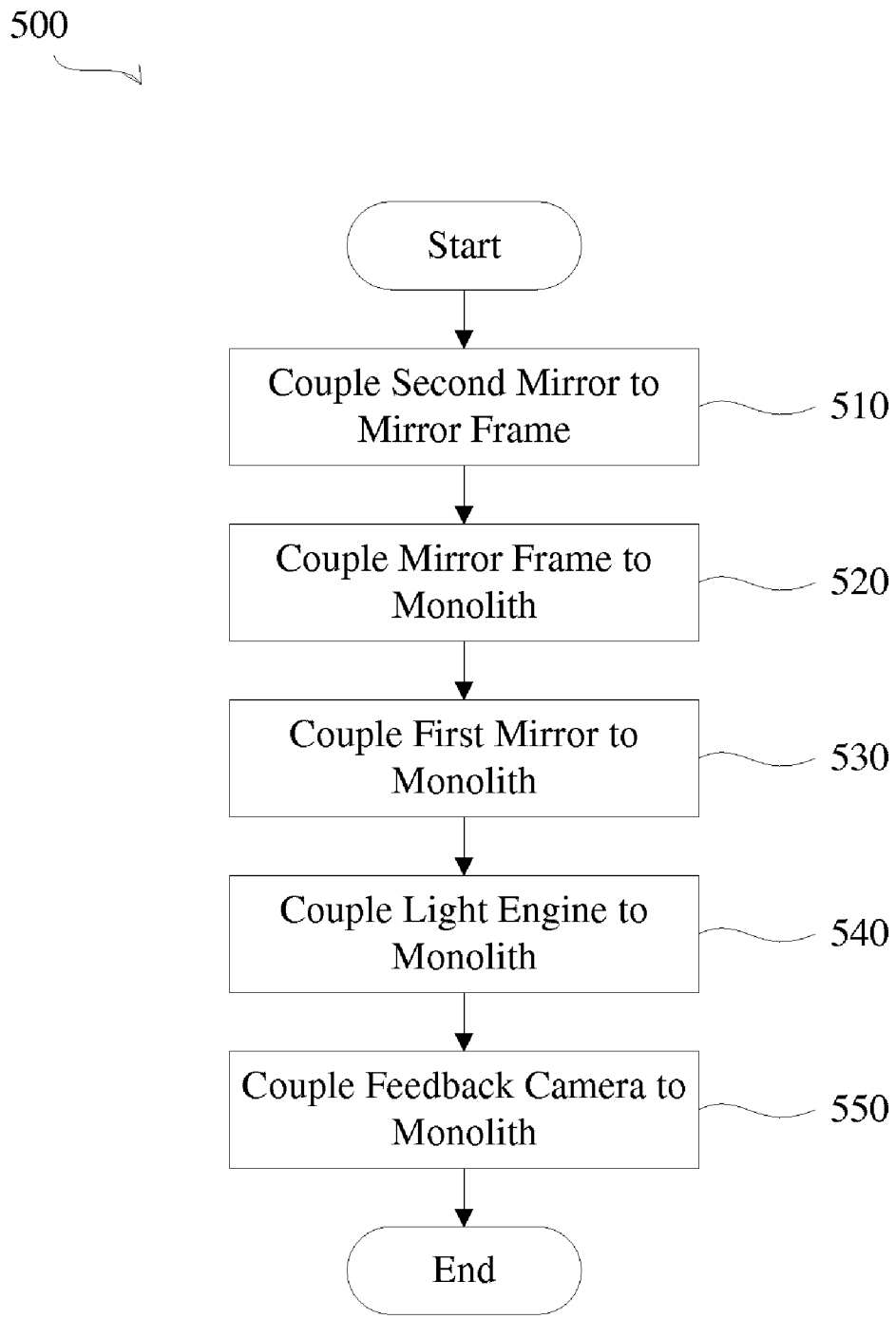
FIG. 5 is a flowchart illustrating a method of assembling the assembly.

FIG. 5 is a flowchart illustrating a method 500 of assembling the assembly 100. First, the second mirror 130 is coupled (510) to the mirror frame 305 via a plurality of fasteners 310 or other mechanism. The mirror frame 305 is then coupled (520) to the monolith 150. The first mirror 120 is then coupled (530) to the monolith 150. The light engine 110 is then coupled (540) to the monolith 150. The feedback camera 215 is then coupled (550) to the monolith 150. The method 500 then ends.

Accordingly, all optical components are coupled to the monolith 150, thereby ensuring a central element for reference. In an embodiment of the invention, the method 500 can be performed in a clean room. In an embodiment of the invention, the coupling (510-550) can be performed in an order other than the order described above. In an embodiment of the invention, after the coupling (550), the screen 140 can be coupled to the monolith 150. In an embodiment of the invention, after the coupling (550), the assembly 100 can be installed into a projection display by mounting the monolith 150 to a housing of the display. In an embodiment of the invention wherein the assembly 100 has a single mirror, the coupling (510-520) or the coupling (530) can be skipped.

The foregoing description of the illustrated embodiments of the present invention is by way of example only, and other variations and modifications of the above-described embodiments and methods are possible in light of the foregoing teaching. For example, components can be coupled together via a plurality of mechanisms, such as fasteners, adhesives, etc. Further, the monolith 150 can take a variety of shapes as long as it can provide a reference surface to a plurality of optical components. The embodiments described herein are not intended to be exhaustive or limiting. The present invention is limited only by the following claims.

What is claimed is:

1. A monolith for use in a rear projection display system, comprising:
    a plurality of mounting surfaces for mounting a plurality of optical components, the optical components including at least one mirror and a light engine;
    wherein the monolith provides a reference surface, thereby enabling alignment of the plurality of optical components based on the reference surface.

2. The monolith of claim 1, further comprising a mounting surface for coupling a screen thereto.

3. The monolith of claim 2, further being adapted to couple a feedback camera thereto such that the feedback camera is facing the screen.

4. The monolith of claim 1, wherein the at least one mirror includes a first mirror and a second mirror, wherein the second mirror is larger than the first mirror.

5. The monolith of claim 4, wherein the mounting surfaces are oriented such that light from the light engine reflects off of the first mirror onto the second mirror and from the second mirror onto a screen.

6. An assembly for use in a rear projection display system, comprising:
    a plurality of optical components; and
    a monolith having a plurality of mounting surfaces for mounting the plurality of optical components, the optical components including at least one mirror and a light engine;
    wherein the monolith provides a reference surface, thereby enabling alignment of the plurality of optical components based on the reference surface.

7. The assembly of claim 6, further comprising a screen and wherein the monolith further comprises a mounting surface for coupling the screen thereto.

8. The assembly of claim 7, further comprising a feedback camera, wherein the monolith is further adapted to couple the feedback camera thereto such that the feedback camera is facing the screen.

9. The assembly of claim 6, wherein the at least one mirror includes a first mirror and a second mirror, wherein the second mirror is larger than the first mirror.

10. The assembly of claim 9, wherein the mounting surfaces are oriented such that light from the light engine reflects off of the first mirror onto the second mirror and from the second mirror onto a screen.

11. A method for assembling an assembly for use in a rear projection display system, comprising:
    providing a plurality of optical components;
    providing a monolith; and
    coupling the plurality of optical components to the monolith, wherein the monolith has a plurality of mounting surfaces for mounting the plurality of optical components, the optical components including at least one mirror and a light engine; wherein the monolith provides a reference surface, thereby enabling alignment of the plurality of optical components based on the reference surface.

12. The method of claim 11, farther comprising coupling a screen to the monolith and wherein the monolith further comprises a mounting surface for coupling the screen thereto.

13. The method of claim 12, farther comprising coupling a feedback camera to the monolith, wherein the monolith is further adapted to couple the feedback camera thereto such that the feedback camera is facing the screen.

14. The method of claim 11, wherein the at least one mirror includes a first mirror and a second mirror, wherein the second mirror is larger than the first mirror.

15. The method of claim 14, wherein the mounting surfaces are oriented such that light from the light engine reflects off of the first mirror onto the second mirror and from the second mirror onto a screen.

16. A monolith for use in a rear projection display system, comprising:
   four sides including a top side and a bottom side;
   a peripheral lip with at least one tab extending from a side, the tab for coupling an electronic circuit to the monolith;
   wherein the sides form four corners adapted for coupling a mirror frame holding a first mirror to the monolith;
   wherein the top side is adapted to couple a feedback camera to the top of the plate;
   a bottom plate integral to the bottom side and extending in a forwards direction from the front of the monolith, the bottom plate having a pair of mirror mounts forwardly extending therefrom, which are adapted for mounting a second mirror;
   the bottom plate having a pair of arms and downwardly depending from the bottom plate, the arms and adapted for mounting a light engine and related electronics thereto.

* * * * *